United States Patent
Yamato et al.

(10) Patent No.: US 12,128,639 B2
(45) Date of Patent: Oct. 29, 2024

(54) FORMING DEVICE AND FORMING METHOD

(71) Applicant: MITSUBISHI HEAVY INDUSTRIES, LTD., Tokyo (JP)

(72) Inventors: Homare Yamato, Tokyo (JP); Masahiko Shimizu, Tokyo (JP); Shoya Mano, Tokyo (JP); Toshiki Kitazawa, Tokyo (JP); Hideki Horizono, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 135 days.

(21) Appl. No.: 17/909,565

(22) PCT Filed: Jul. 31, 2020

(86) PCT No.: PCT/JP2020/029474
§ 371 (c)(1),
(2) Date: Sep. 6, 2022

(87) PCT Pub. No.: WO2022/024359
PCT Pub. Date: Feb. 3, 2022

(65) Prior Publication Data
US 2023/0110534 A1    Apr. 13, 2023

(51) Int. Cl.
*B29C 70/46* (2006.01)
*B29C 33/20* (2006.01)
(Continued)

(52) U.S. Cl.
CPC ......... *B29C 70/462* (2013.01); *B29C 70/465* (2013.01); *B29K 2105/0872* (2013.01); *B29L 2031/003* (2013.01)

(58) Field of Classification Search
CPC ..... B29C 70/461; B29C 70/462; B29C 70/46; B29C 33/26; B29C 33/444; B29C 33/442;
(Continued)

(56) References Cited

U.S. PATENT DOCUMENTS 4,961,700 A * 10/1990 Dunbar ............... B29C 70/48
                                                  425/398
5,128,090 A *  7/1992 Fujii ................... B29C 51/145
                                                  425/388

(Continued)

FOREIGN PATENT DOCUMENTS

JP  2007-260925 A  10/2007
JP  2017-030329 A   2/2017

OTHER PUBLICATIONS

PCT/ISA/210, "International Search Report for PCT International Application No. PCT/JP2020/029474," Sep. 29, 2020.

*Primary Examiner* — Matthew J Daniels
(74) *Attorney, Agent, or Firm* — HAUPTMAN HAM, LLP

(57) ABSTRACT

A forming device includes: a forming jig extending along an axial direction; a forming die having a shape corresponding to a top part region and a wall part region of the forming jig; and a movement mechanism that moves the forming die so as to approach a bottom part region along a height direction HD. The forming die includes: a body part; a plate-shaped forming part that is attached to the body part so as to be swingable around a swing shaft; and a pressurization part that generates a pressurization force which causes a distal end part of the forming part to push a layered body against the wall part region when the forming die is moved by the movement mechanism so as to approach the bottom part region. In accordance with the distal end part, the part causes a contact surface to contact a region of the layered body.

6 Claims, 8 Drawing Sheets

(51) Int. Cl.
*B29K 105/08* (2006.01)
*B29L 31/00* (2006.01)

(58) Field of Classification Search
CPC ..... B29C 70/541; B29C 70/543; B29C 70/56; B29C 33/302; B29C 2033/207
See application file for complete search history.

(56) References Cited

U.S. PATENT DOCUMENTS

| | | | |
|---|---|---|---|
| 7,708,546 | B2 | 5/2010 | Lee et al. |
| 9,636,876 | B2* | 5/2017 | Lee ................. B29C 70/541 |
| 9,782,937 | B1* | 10/2017 | Modin ................. B29C 70/342 |
| 10,399,284 | B2 | 9/2019 | Prause et al. |
| 2001/0045684 | A1* | 11/2001 | Blanchon ............ B29C 70/541 |
| | | | 264/294 |
| 2012/0234489 | A1* | 9/2012 | De Mattia ............ B29C 70/549 |
| | | | 156/60 |
| 2012/0312459 | A1* | 12/2012 | De Mattia ............ B29C 70/30 |
| | | | 156/481 |
| 2016/0059500 | A1* | 3/2016 | Hosokawa ............ B29C 70/48 |
| | | | 425/521 |
| 2018/0126604 | A1 | 5/2018 | Tokutomi |
| 2019/0070772 | A1* | 3/2019 | Stone ................. B29D 99/0003 |
| 2020/0282666 | A1* | 9/2020 | Lathrop ............ B29D 99/0003 |
| 2021/0107238 | A1* | 4/2021 | Saini ................. B29D 99/0014 |
| 2021/0229376 | A1* | 7/2021 | Pridie ................. B64C 3/20 |
| 2022/0080683 | A1* | 3/2022 | Plummer ............ B29C 33/308 |
| 2022/0212423 | A1* | 7/2022 | Sundquist ............ B29C 70/462 |
| 2023/0271375 | A1* | 8/2023 | Kondo ................. B29C 70/541 |
| | | | 264/339 |

* cited by examiner

FORMING DEVICE AND FORMING METHOD

RELATED APPLICATIONS

The present application is National Phase of International Application No. PCT/JP2020/029474 filed Jul. 31, 2020, the disclosure of which is hereby incorporated by reference herein in its entirety.

TECHNICAL FIELD

The present disclosure relates to a forming device and a forming method that form a stacked body, which has been formed in a flat shape by stacking a plurality of sheet-shaped composite materials including a fiber base material and a resin material, into a target shape.

BACKGROUND ART

Composite structural members used in aircraft and the like have an arbitrary cross-sectional shape, and as a method for manufacturing the composite structural members, a method of obtaining a target shape by molding a stacked body (charge) in which reinforcing fiber sheets are stacked flat over a plurality of layers has been known (see, for example, PTL 1). PTL 1 discloses that the ply is formed along the shape of the molding surface of the mandrel by pressing the finger portions of the ply sweeper against the ply installed on the mandrel while spreading the finger portion.

CITATION LIST

Patent Literature

[PTL 1] Specification of U.S. Pat. No. 10,399,284

SUMMARY OF INVENTION

Technical Problem

However, in PTL 1, the diaphragm covering the ply is sealed and evacuated to keep the ply pressed against the molding surface of the mandrel. Therefore, for example, when the ply sweeper moves before the ply is securely pressed against the molding surface of the mandrel by the diaphragm, a part of the ply may be separated from the molding surface and deformed into a shape different from the surface shape of the mandrel.

The present disclosure has been made in view of such circumstances, and an object of the present disclosure is to provide a forming device and a forming method capable of reliably maintaining a state where a stacked body formed by stacking a plurality of sheet-shaped composite materials including a fiber base material and a resin material is formed along the shape of a forming jig.

Solution to Problem

A forming device according to one aspect of the present disclosure is a forming device that forms a stacked body formed by stacking a plurality of sheet-shaped composite materials including a fiber base material and a resin material, the forming device including: a forming jig that extends in an axial direction, and has, in a width direction that is orthogonal to the axial direction, a bottom region having a first height, a top region having a second height higher than the first height, and a wall region that is adjacent to both the bottom region and the top region and has a height gradually decreasing from the second height to the first height; a forming die having a shape corresponding to the top region and the wall region of the forming jig; and a movement mechanism that moves the forming die or the forming jig such that the forming die approaches the bottom region in a height direction that is orthogonal to both the axial direction and the width direction, and forms the stacked body placed on the top region of the forming jig along a shape of the forming jig, in which the forming die includes a main body portion, a plate-shaped forming portion having a base end portion attached to the main body portion to be swingable around a swing shaft extending in the axial direction, and a contact surface formed in a shape corresponding to the wall region, and a pressurizing portion that generates a pressurizing force by which a tip end portion of the forming portion presses the stacked body against the wall region, when the forming die is moved to approach the bottom region by the movement mechanism, and when the tip end portion reaches a predetermined position in the height direction, the forming portion brings the contact surface into contact with a region of the stacked body formed along the wall region by the tip end portion to maintain a state where the stacked body is pressed against the wall region.

A forming method according to another aspect of the present disclosure is a forming method for pressing a forming die against a stacked body in which a plurality of sheet-shaped composite materials including a fiber base material and a resin material are stacked to form the stacked body into a shape of a forming jig, in which the forming jig extends in an axial direction, and has, in a width direction that is orthogonal to the axial direction, a bottom region having a first height, a top region having a second height higher than the first height, and a wall region that is adjacent to both the bottom region and the top region and has a height gradually decreasing from the second height to the first height, the forming die has a shape corresponding to the top region and the wall region of the forming jig, and includes a main body portion, a plate-shaped forming portion having a base end portion attached to the main body portion to be swingable around a swing shaft extending in the axial direction, and a contact surface formed in a shape corresponding to the wall region, and a pressurizing portion that generates a pressurizing force by which a tip end portion of the forming portion presses the stacked body against the wall region, when the forming die is moved to approach the bottom region, the forming method including: a forming step of moving the forming die or the forming jig such that the forming die approaches the bottom region in a height direction that is orthogonal to both the axial direction and the width direction, and forms the stacked body placed on the top region of the forming jig along a shape of the forming jig, in which in the forming step, when the tip end portion reaches a predetermined position in the height direction, the contact surface is brought into contact with a region of the stacked body formed along the wall region by the tip end portion to maintain a state where the stacked body is pressed against the wall region.

Advantageous Effects of Invention

According to the present disclosure, it is possible to provide a forming device and a forming method capable of reliably maintaining a state where a stacked body formed by stacking a plurality of sheet-shaped composite materials including a fiber base material and a resin material is formed along the shape of a forming jig.

DESCRIPTION OF EMBODIMENTS

Hereinafter, embodiments relating to the present disclosure will be described. Each embodiment described below shows one aspect of the present disclosure and is not intended to limit this disclosure. Each embodiment described below can be arbitrarily modified within the scope of the technical idea of the present disclosure.

Figure 1:
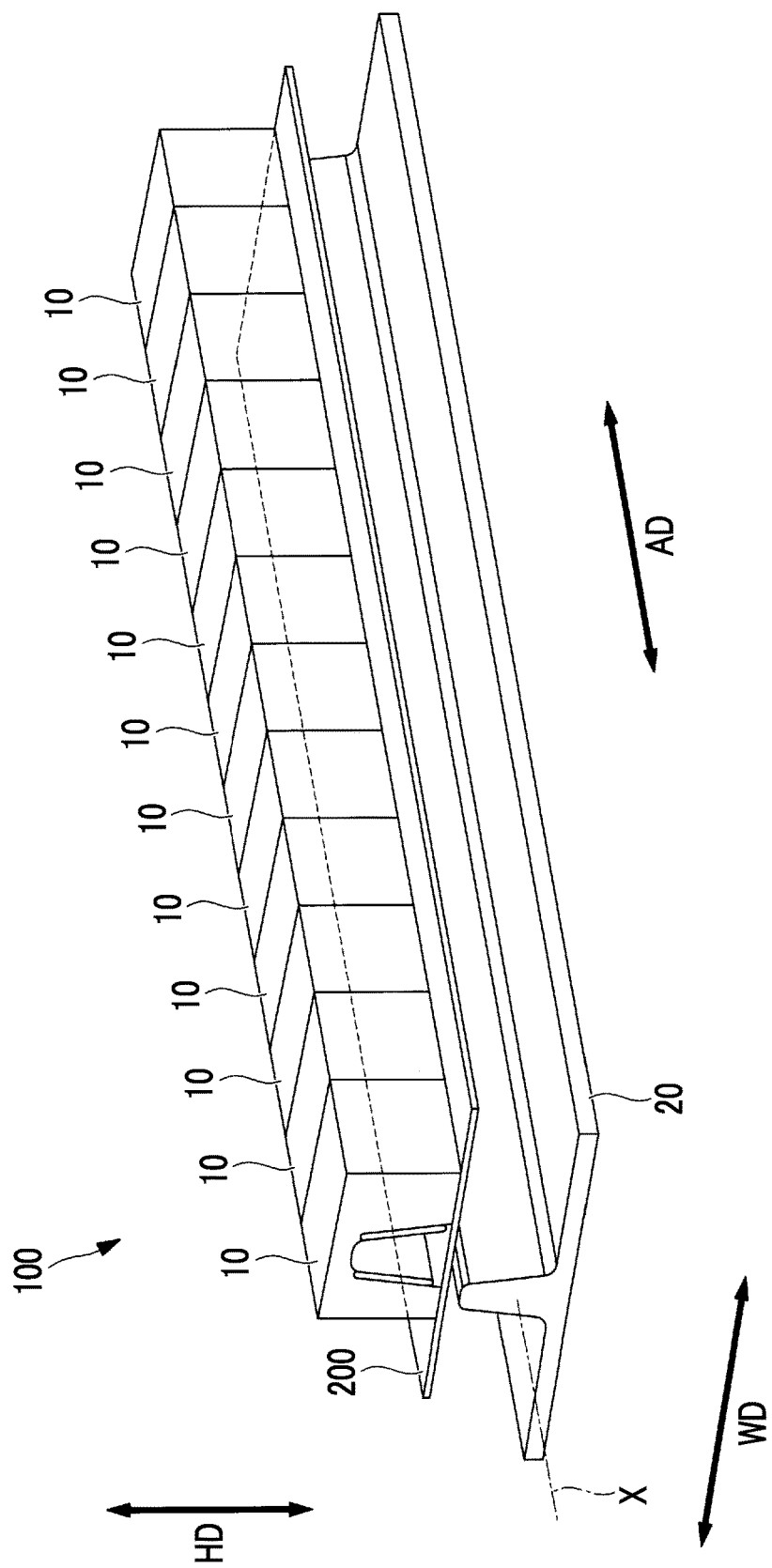
FIG. 1 is a perspective view showing a forming device according to an embodiment of the present disclosure, showing a state before forming a stacked body.
Figure 2:
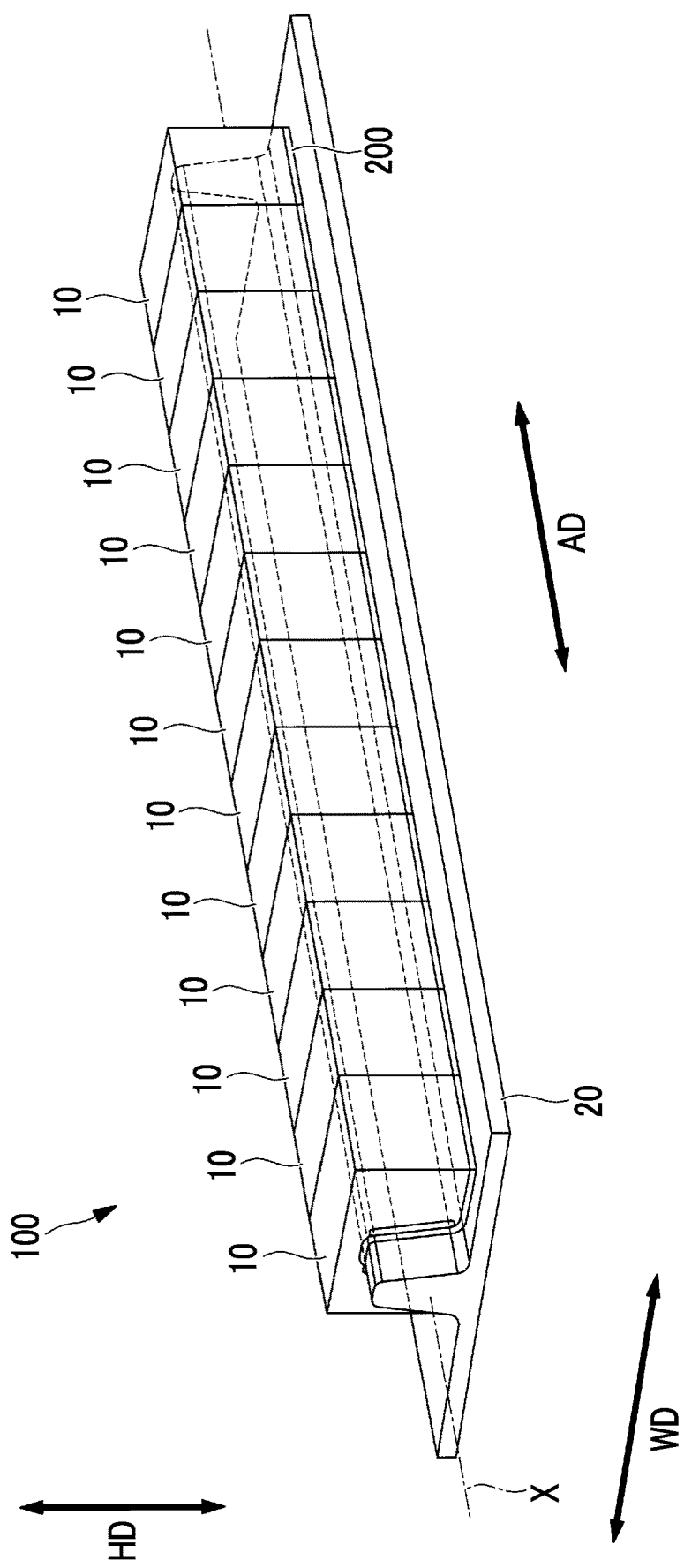
FIG. 2 is a perspective view showing the forming device according to the embodiment of the present disclosure, showing a state in which the stacked body is formed.

Hereinafter, a forming device 100 according to an embodiment of the present disclosure and a forming method of a stacked body 200 using the forming device 100 will be described with reference to the drawings. FIG. 1 is a perspective view showing the forming device 100 according to the present embodiment, and shows a state before forming the stacked body 200. FIG. 2 is a perspective view showing the forming device 100 according to the present embodiment, and shows a state in which the stacked body 200 is formed.

As shown in FIGS. 1 and 2, the forming device 100 of the present embodiment includes a plurality of forming dies 10 arranged in an axial direction AD, and a forming jig 20. Further, although omitted in FIGS. 1 and 2, the forming device 100 of the present embodiment includes a movement mechanism 30 and a heating mechanism 40, which will be described later. The forming device 100 of the present embodiment is a device that forms the stacked body 200 in which a plurality of sheet-shaped composite materials including a fiber base material and a resin material are stacked along the shape of the forming jig 20.

The forming device 100 forms the stacked body 200 along the surface shape of the forming jig 20 by placing the lower surface of the stacked body 200 formed in a flat shape before forming on the forming jig 20 and moving a plurality of forming dies 10 installed on the upper surface of the stacked body 200 by the movement mechanism 30 downward in the height direction HD. By the forming process by the forming device 100, the stacked body 200 is deformed from the flat shape shown in FIG. 1 to the shape along the forming jig 20 shown in FIG. 2.

In the example shown in FIGS. 1 and 2, a plurality of forming dies 10 are arranged in the axial direction AD, but other aspects may be used. For example, a forming device using a single forming die 10 having the same length in the axial direction AD as the plurality of forming dies 10 shown in FIGS. 1 and 2 may be used. Alternatively, a forming device using the plurality of forming dies 10 having a longer length in the axial direction AD than the forming dies 10 shown in FIGS. 1 and 2 may be used.

The composite material configuring the stacked body 200 is a sheet-shaped intermediate molding material in which a matrix resin (resin material) is attached to a fiber base material and is semi-integrated. The stacked body 200 is, for example, an intermediate molding material formed in a flat shape, and is used as a structure such as an aircraft fuselage by being solidified after being formed into a desired shape. The stacked body 200 formed in a flat shape by stacking a plurality of sheet-shaped fiber base materials (dry sheets) that do not include a matrix resin may be used.

The fiber base material contained in the composite material is, for example, carbon fiber, glass fiber, aramid fiber, or the like. Further, as the matrix resin contained in the composite material, either a thermoplastic resin material or a thermosetting resin material can be used. The thermosetting resin is, for example, an epoxy resin, an unsaturated polyester, a vinyl ester, a phenol, a cyanate ester, a polyimide, or the like.

Examples of the thermoplastic resin material include polyetheretherketone (PEEK), polyethylene terephthalate (PET), polybutylene terephthalate (PBT), nylon 6 (PA6), nylon 66 (PA66), polyphenylene sulfide (PPS), polyetherimide (PEI), polyetherketoneketone (PEKK), and the like.

As shown in FIG. 1, the forming jig 20 is a jig that extends in the axial direction AD and has an undulating shape in the width direction WD orthogonal to the axial direction AD. The axial direction AD is a direction parallel to the axis line X extending parallel to the installation surface S on which the forming jig 20 is installed. The forming jig 20 is made of, for example, a metal material. As shown in FIGS. 1 and 2, the forming jig 20 of the present embodiment has the same shape (cross-sectional shape shown in FIG. 3) at each position in the axial direction AD.

Figure 3:
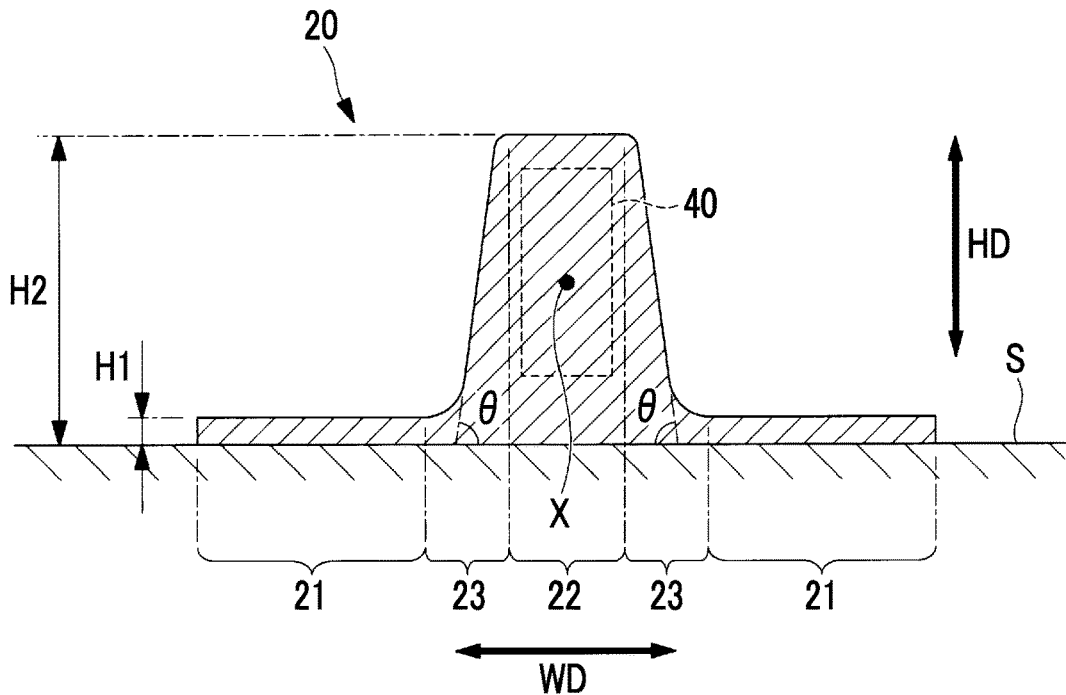
FIG. 3 is a cross-sectional view of the forming jig shown in FIG. 1 cut along a plane orthogonal to an axial direction.

Next, the forming jig 20 of the present embodiment will be described in detail. FIG. 3 is a cross-sectional view of the forming jig 20 shown in FIG. 1 cut along a plane orthogonal to the axial direction AD. The forming jig 20 has a pair of bottom regions 21, a top region 22, and a pair of wall regions 23 in the width direction WD. The forming jig 20 has a shape in which the bottom regions 21 at both end portions in the width direction WD are recessed with respect to the top region 22. Here, the central portion in the width direction WD is any part of the region other than both end portions in the width direction WD.

The pair of bottom regions 21 are regions having a first height H1 with respect to the installation surface S, and are provided at both end portions of the forming jig 20 in the width direction WD. The upper surface of the bottom region 21 is a flat surface parallel to the installation surface. The top region 22 is a region having a second height H2 higher than the first height H1 and is provided in the central portion of the forming jig 20 in the width direction WD. The upper surface of the top region 22 is a flat surface parallel to the installation surface S.

The wall regions 23 are regions adjacent to both the bottom regions 21 and the top region 22 in the width direction WD, and the height gradually decreases from the second height H2 to the first height H1. The upper surface of the wall region 23 is a flat surface inclined at an inclination angle θ with respect to the installation surface S, except for a portion connected to the bottom region 21 and a portion connected to the top region 22.

Figure 4:
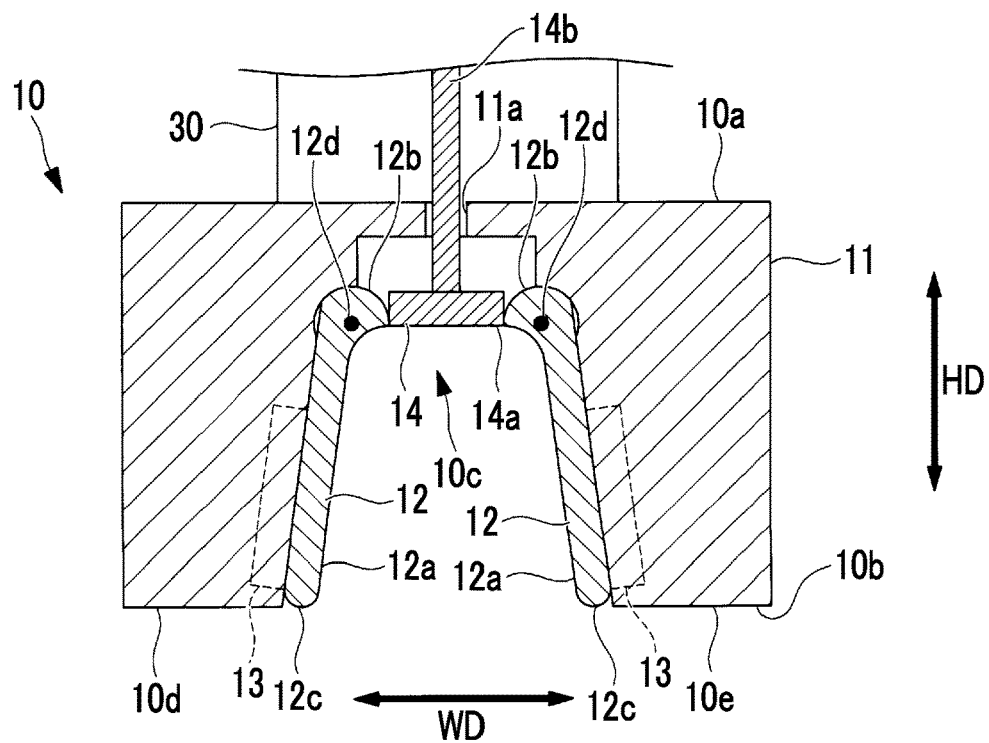
FIG. 4 is a cross-sectional view of a forming die shown in FIG. 1 cut along a plane orthogonal to the axial direction.

Next, the forming die 10 of the present embodiment will be described in detail. FIG. 4 is a cross-sectional view of the forming die 10 shown in FIG. 1 cut along a plane orthogonal to the axial direction AD. The forming die 10 shown in FIG. 4 is a member that forms the stacked body 200 placed on the forming jig 20 along the shape of the forming jig 20. The forming die 10 has a shape corresponding to the bottom region 21, the top region 22, and the wall region 23 of the forming jig 20. The forming die 10 is formed of, for example, a metal material containing aluminum or iron, or a resin material such as plastic.

As shown in FIGS. 1 and 2, the forming die 10 has a substantially rectangular parallelepiped shape in which the length along the width direction WD is longer than the length along the axial direction AD. As shown in FIG. 4, the forming die 10 has a shape in which the upper surface 10a is formed in a flat shape and the lower surface 10b is recessed toward the upper surface 10a in the central portion in the width direction WD. The lower surface 10b has a recessed portion 10c, a flat portion 10d, and a flat portion 10e.

The recessed portion 10c has a shape corresponding to the shape of the top region 22 and the pair of wall regions 23 of the forming jig 20. The recessed portion 10c has a shape that coincides with the outer peripheral surface of the stacked body 200 that is disposed in contact with the top region 22 and the pair of wall regions 23. That is, the recessed portion 10c has a shape obtained by expanding the shapes of the top region 22 and the pair of wall regions 23 of the forming jig 20 by the thickness of the stacked body 200. The flat portion 10d and the flat portion 10e are disposed on both sides of the recessed portion 10c in the width direction WD, and have a flat shape extending in parallel with the upper surface 10a.

Here, the flat portion 10d and the flat portion 10e have a flat shape extending in parallel with the upper surface 10a, but other aspects may be used. For example, the flat portion 10d and the flat portion 10e may be a surface having an arbitrary inclination that is not parallel to the upper surface 10a, or a curved surface.

As shown in FIG. 4, the forming die 10 has a main body portion 11, a pair of forming portions 12, a pair of pressurizing portions 13, and a pressing portion 14. The main body portion 11 is a member attached to the movement mechanism 30. The pair of forming portions 12 are plate-shaped members extending in the axial direction AD, and have contact surfaces 12a formed in a shape corresponding to the wall regions 23 of the forming jig 20.

The base end portion 12b of the forming portion 12 is attached to the main body portion 11 to be swingable around the swing shaft 12d extending in the axial direction AD. The forming portion 12 brings the contact surface 12a into contact with the region of the stacked body 200 formed along the wall region 23 by the tip end portion 12c to keep a state where the stacked body 200 is pressed against the wall region 23, when the tip end portion 12c reaches a predetermined position in the height direction HD.

The pressurizing portion 13 generates a pressurizing force by which the tip end portion 12c of the forming portion 12 presses the stacked body 200 against the wall region 23 of the forming jig 20, when the forming die 10 is moved to approach the bottom region 21 of the forming jig 20 by the movement mechanism 30. The pressurizing portion 13 is accommodated in, for example, a recess provided on the back surface (the surface opposite to the contact surface 12a) of the forming portion 12 of the main body portion 11, and generates a pressurizing force for pressing the contact surface 12a of the forming portion 12 toward the recessed portion 10c.

The pressurizing portion 13 is formed of, for example, an elastic body such as elastically deformable sponge rubber. Further, the pressurizing portion 13 may be a bag body formed of a resin or the like that generates a pressurizing force by introducing compressed air. When the pressurizing portion 13 is formed of a bag body, it is desirable to provide a control unit that controls the supply amount of the compressed air introduced into the bag body. By controlling the supply amount of the compressed air introduced into the bag body by the control unit, the stacked body 200 can be pressurized by the contact surface 12a with an appropriate pressurizing force.

The pressing portion 14 is a mechanism that presses the stacked body 200 against the top region 22 of the forming jig 20. The pressing portion 14 includes s a pressing member 14a that comes into contact with the stacked body 200, and a moving member 14b that is connected to the pressing member 14a and moves the pressing member 14a in the height direction HD. The surface of the pressing member 14a that comes into contact with the stacked body 200 is a flat surface.

The moving member 14b is inserted into a through-hole 11a extending in the height direction HD provided in the main body portion 11, and moves in the height direction HD by the pressurizing force generated by the pressurizing force generation mechanism (not shown). The moving member 14b transmits a pressurizing force for forming the stacked body 200 along the shape of the top region 22 to the pressing member 14a, in a state where the pressing member 14a is in contact with the stacked body 200 placed on the top region 22.

The movement mechanism 30 in the forming device 100 is a mechanism for moving the forming die 10 to approach the bottom region 21 in the height direction HD orthogonal to both the axial direction AD and the width direction WD. As shown in FIG. 3, the movement mechanism 30 is attached to the upper surface 10a of the forming die 10. The movement mechanism 30 presses the forming die 10 against the stacked body 200 placed on the top region 22 of the forming jig 20 and moves the forming die 10 downward to form the stacked body 200 into the shape of the forming jig 20.

The movement mechanism 30 is attached to the forming die 10 and moves the forming die 10 in the height direction HD to approach the bottom region of the forming jig 20, but other aspects may be used. For example, the movement mechanism 30 may be attached to the forming jig 20 and may move the forming jig 20 to approach the forming die 10 fixed in the height direction HD.

The heating mechanism 40 in the forming device 100 is a mechanism for heating the resin material contained in the stacked body 200 to a temperature equal to or higher than the softening temperature. As shown in FIG. 3, the heating mechanism 40 is provided inside the forming jig 20, and is configured with, for example, a heat transfer heater. Since the forming jig 20 is formed of a metal material, the heat generated by the heating mechanism 40 is transferred to the top region 22, the wall regions 23, and the bottom regions 21 of the forming jig 20, respectively.

The heating mechanism 40 shown in FIG. 3 is provided inside the forming jig 20, but other aspects may be used. For example, the heating mechanism 40 may be provided inside the forming die 10. Alternatively, the heating mechanism 40 may be provided both inside the forming jig 20 and inside the forming die 10. Further, for example, the heating mechanism 40 may be provided outside the forming jig 20 and the forming die 10 in a manner that the space in which the forming jig 20 and the forming die 10 are accommodated is heated by the heating mechanism 40.

Here, the softening temperature will be described. When a thermoplastic resin material is used as the matrix resin, the softening temperature of the matrix resin is a temperature lower than the melting point of the thermoplastic resin material by a predetermined temperature (for example, 30° C.). When a thermosetting resin material is used as the matrix resin, the softening temperature of the matrix resin is a temperature within a range that is equal to or higher than the temperature at which the thermosetting resin material is softened by heat and deformed without cracking even when an external force is applied, and is equal to or lower than the temperature at which the curing reaction of the thermosetting resin material starts.

Next, a forming method of the stacked body 200 using the forming device 100 of the present embodiment will be described. The forming method of the present embodiment is a method for pressing the forming jig 20 against the stacked body 200 obtained by stacking a plurality of sheet-shaped composite materials including a fiber base material and a resin material to form the stacked body 200 into the shape of the forming jig 20. The shape of the stacked body 200 formed by the forming device 100 of the present embodiment after the final forming is a hat-shaped cross-sectional shape shown in FIG. 8.

Figure 5:
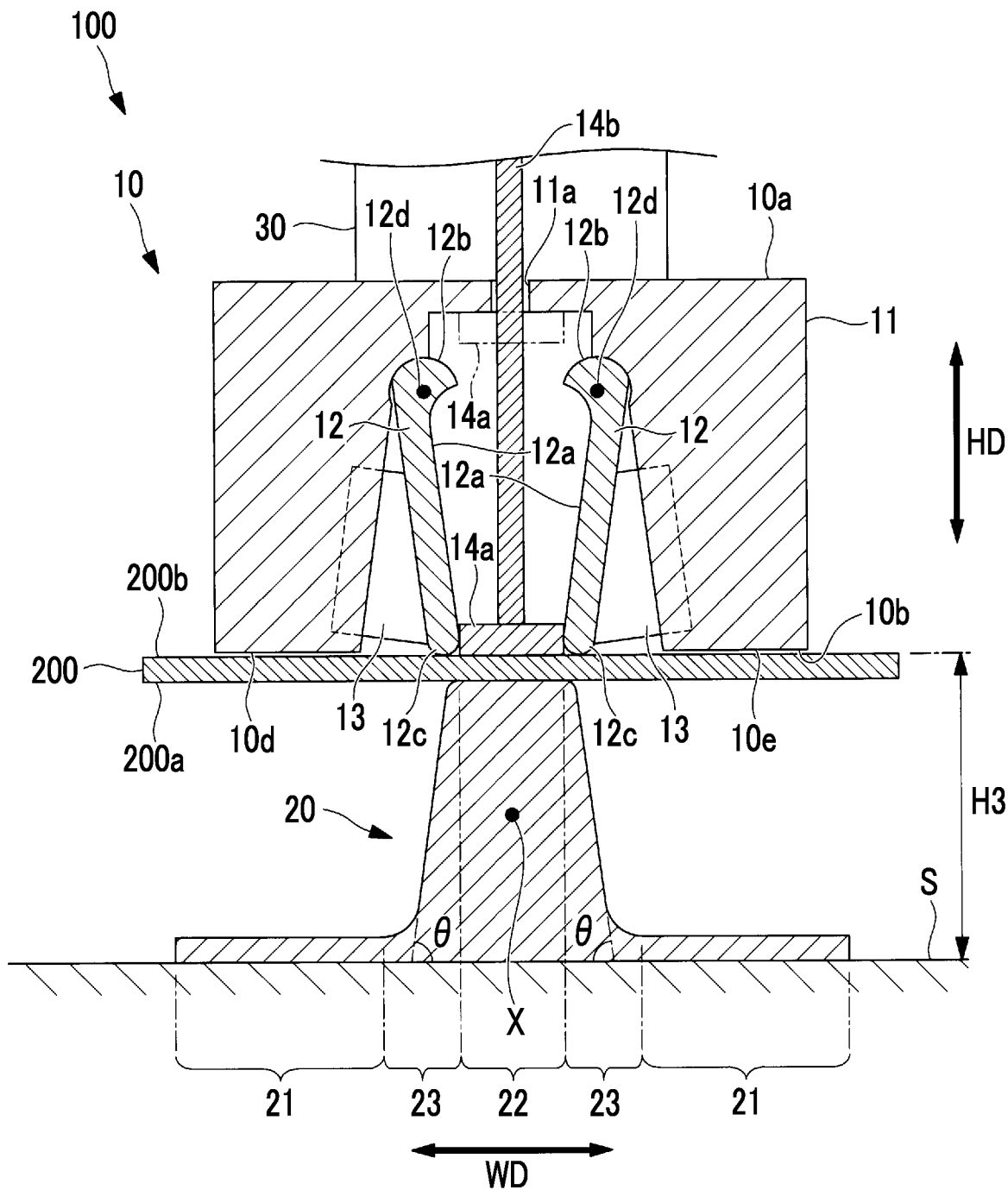
FIG. 5 is a cross-sectional view of the forming device showing a state before forming the stacked body.
Figure 6:
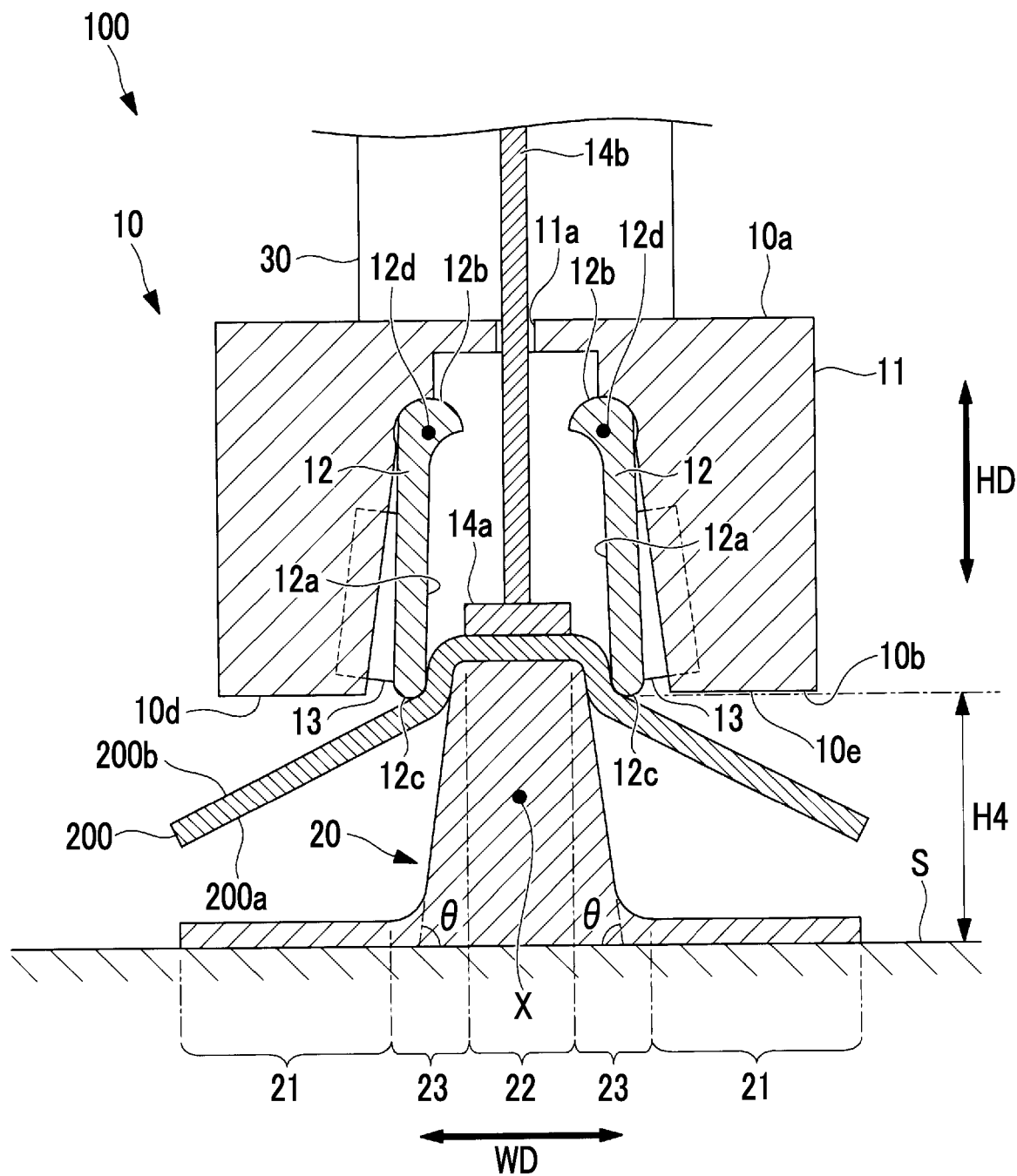
FIG. 6 is a cross-sectional view of the forming device showing a state during forming the stacked body.
Figure 7:
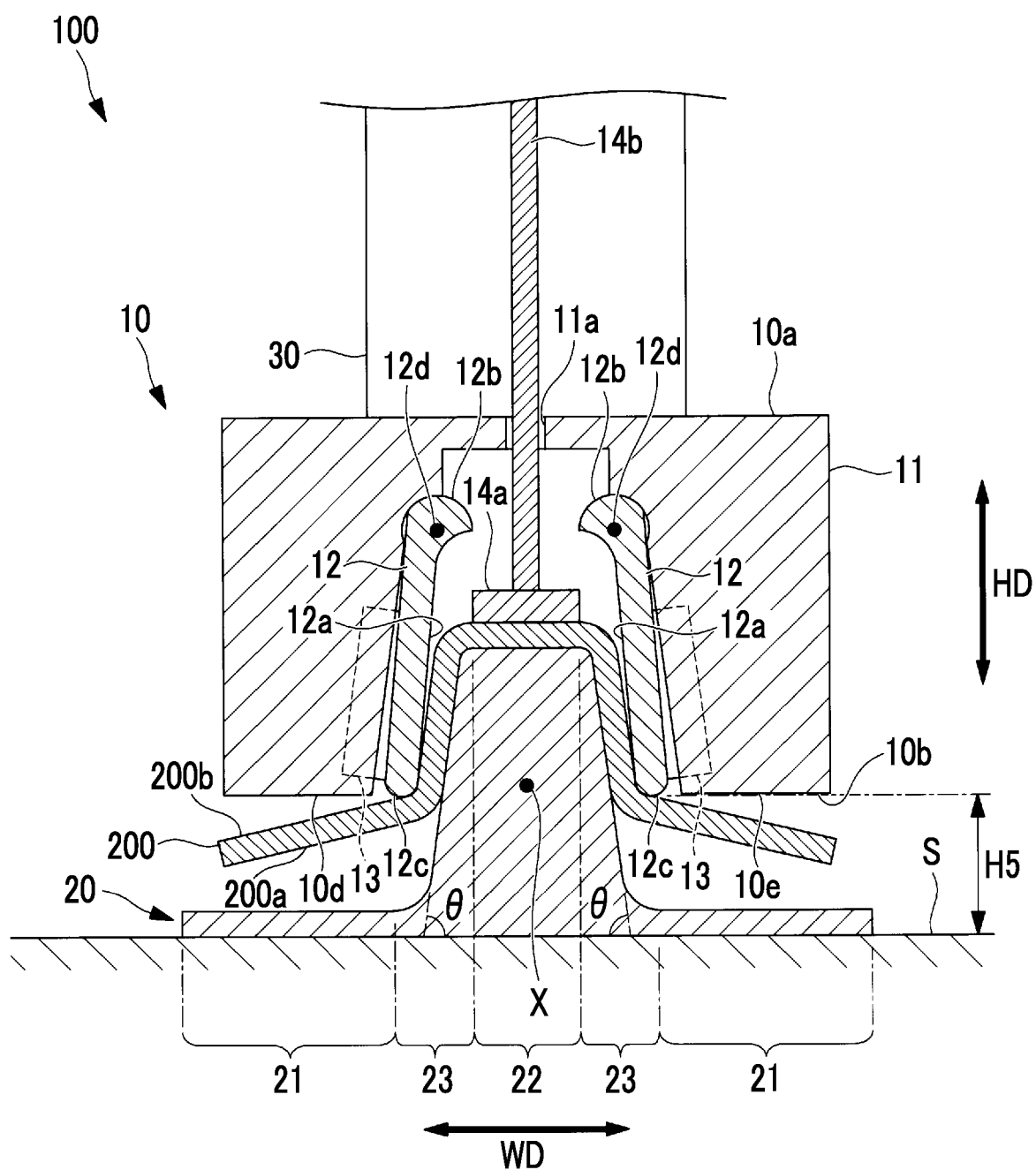
FIG. 7 is a cross-sectional view of the forming device showing a state during the forming the stacked body.
Figure 8:
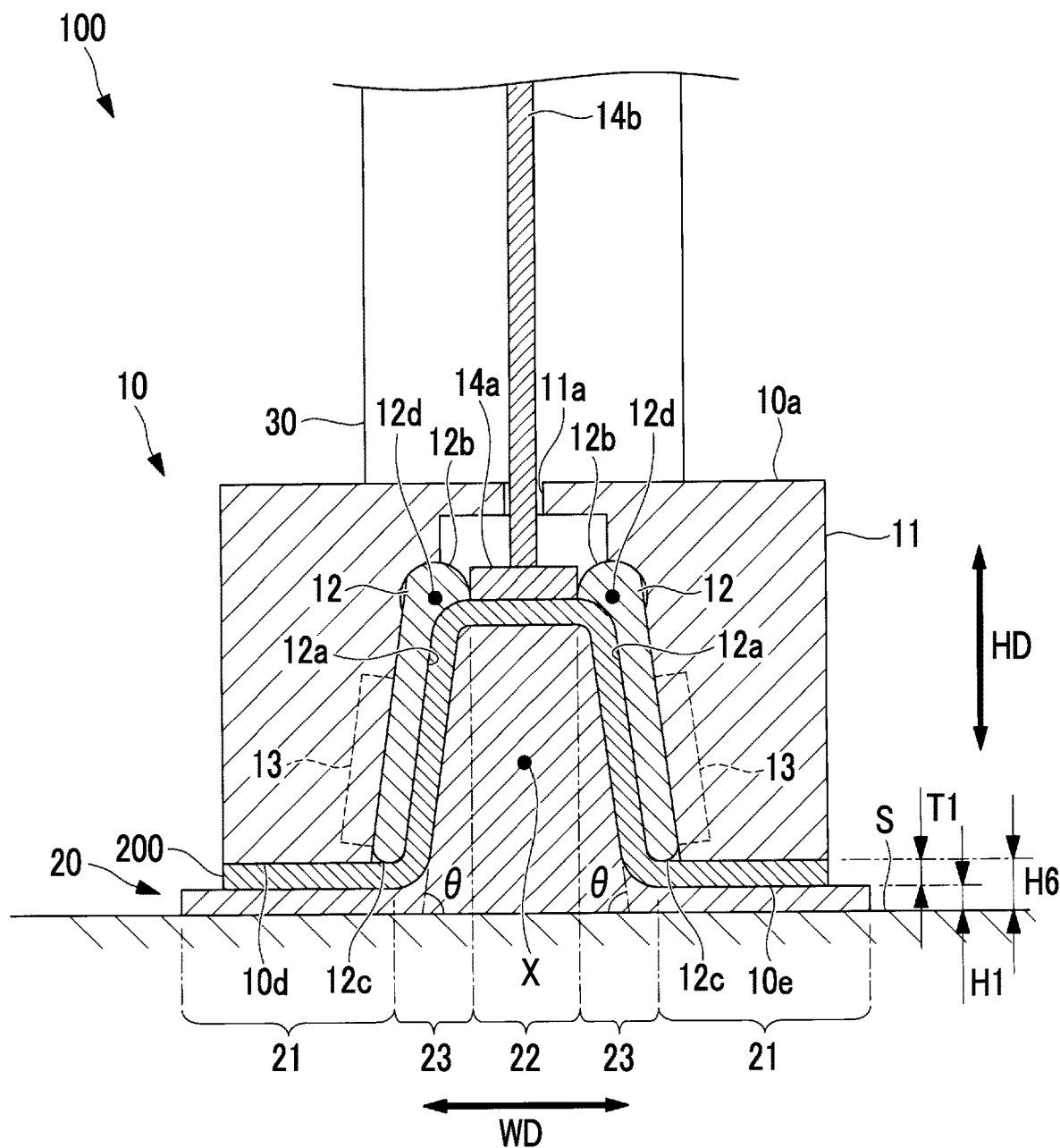
FIG. 8 is a cross-sectional view of the forming device showing a state after forming of the stacked body is completed.

In the forming method of the present embodiment, by placing the flat stacked body 200 shown in FIG. 5 on the forming jig 20, and pressing the forming die 10 against the stacked body 200 and moving the stacked body 200 downward, the stacked body 200 is formed to have a first state during the forming shown in FIG. 6, have a second state during the forming shown in FIG. 7, and finally have the hat-shaped cross-sectional shape shown in FIG. 8.

In the forming method of the present embodiment, the heating mechanism 40 included in the forming device 100 heats the forming jig 20 until it reaches the state after the forming of the stacked body 200 shown in FIG. 8 is completed, from the state before forming the stacked body 200 shown in FIG. 5. The heating mechanism 40 heats the forming jig 20 such that the resin material contained in the stacked body 200 placed on the forming jig 20 becomes equal to or higher than the softening temperature (heating step).

In the forming method of the present embodiment, first, the stacked body 200 formed in a flat shape is placed on the forming jig 20, and the lower surface 200*a* of the stacked body 200 is brought into contact with the top region 22 of the forming jig 20. Further, the flat portion 10*d* and the flat portion 10*e* of the forming die 10 are in contact with the upper surface 200*b* of the stacked body 200. The forming device 100 is in the state shown in FIG. 5.

In the state before forming the stacked body 200 shown in FIG. 5, the pressing portion 14 of the forming die 10 moves the moving member 14*b* downward from the upper position (position shown by a two-dot chain line in FIG. 5) in the height direction HD to bring the pressing member 14*a* into contact with the stacked body 200 placed on the top region 22. The pressing portion 14 transmits the pressurizing force for forming the stacked body 200 along the shape of the top region 22 to the pressing member 14*a* via the moving member 14*b*. As shown in FIG. 5, the forming device 100 is in a state where the stacked body 200 is pressed toward the top region 22 of the forming jig 20 by the pressing member 14*a* (pressing step).

In the state shown in FIG. 5, the pair of tip end portions 12*c* of the pair of forming portions 12 are pressed toward the pressing member 14*a* by the pressurizing force generated by the pressurizing portion 13, and come into contact with the side surface of the pressing member 14*a*. The pair of tip end portions 12*c* of the pair of forming portions 12 are located at a position above the position where the pair of wall regions 23 and the top region 22 of the forming jig 20 are connected (at a position of a height H3 from the installation surface S). Therefore, when the forming die 10 is moved downward from the state shown in FIG. 5 and the forming of the stacked body 200 is started, the stacked body 200 can be continuously formed without causing wrinkles from the top region 22 of the forming jig 20 toward the outside in the width direction WD.

Next, in the forming method of the present embodiment, in a state where the stacked body 200 is pressed against the top region 22 of the forming jig 20 by the pressing portion 14, the forming die 10 is moved to approach the bottom region 21 in the height direction HD to form the stacked body 200. The movement mechanism 30 of the forming device 100 moves the forming die 10 to approach the bottom region 21 in the height direction HD (moving step).

When the movement mechanism 30 moves the forming die 10 downward in the height direction HD, the pressurizing portion generates a pressurizing force by which the tip end portion 12*c* of the forming portion 12 presses the stacked body 200 against the wall region 23. Therefore, when the forming die 10 is moved downward in the height direction HD, the stacked body 200 is formed by the tip end portion 12*c* of the forming portion 12 along the shape of the wall region 23 of the forming jig 20.

When the forming die 10 is moved downward in the height direction HD, the pressing portion 14 maintains a state in which the stacked body 200 is pressurized toward the top region 22 of the forming jig 20 by the pressing member 14*a*. The pressing member 14*a* and the moving member 14*b* maintain the position in the height direction HD when the main body portion 11 and the forming portion 12 of the forming die 10 are moved downward in the height direction HD. Thus, the stacked body 200 can be formed by the forming portion 12 while the stacked body 200 is fixed to the top region 22 of the forming jig 20 by the pressing member 14*a*.

The forming die 10 is moved downward in the height direction HD from the state before forming the stacked body 200 shown in FIG. 5, and when the tip end portion 12*c* of the forming portion 12 reaches the position at a height H4 from the installation surface S, it goes into the state shown in FIG. 6. In the state shown in FIG. 6, the stacked body 200 is formed along the shape of the wall region 23 adjacent to the top region 22.

The forming die 10 is further moved downward in the height direction HD from the state shown in FIG. 6, and when the tip end portion 12*c* of the forming portion 12 reaches the position at a height H5 from the installation surface S, it goes into the state shown in FIG. 7. In the state shown in FIG. 7, the stacked body 200 is formed along the shape of the wall region 23 adjacent to the top region 22. The region of the stacked body 200 formed along the shape of the wall region 23 in the state shown in FIG. 7 is wider than the region of the stacked body 200 formed along the shape of the wall region 23 in the state shown in FIG. 6.

The forming die 10 is further moved downward in the height direction HD from the state shown in FIG. 7, and when the tip end portion 12c of the forming portion 12 reaches the position (predetermined position) at a height H6 from the installation surface S, it goes into the state shown in FIG. 8. In the state shown in FIG. 8, when the tip end portion 12c of the forming portion 12 reaches a position in the height H6, the contact surface 12a is brought into contact with the region of the stacked body 200 formed along the wall region 23 by the tip end portion 12c to maintain a state where the stacked body 200 is pressed against the wall region 23.

In the state shown in FIG. 8, the inclination angle of the contact surface 12a of the forming portion 12 with respect to the installation surface S coincides with the inclination angle θ of the wall region 23 of the forming jig 20 with respect to the installation surface. Therefore, the stacked body 200 is in a state of being sandwiched between the entire surface of the wall region 23 of the forming jig 20 and the entire surface of the contact surface 12a of the forming portion 12. The contact surface 12a maintains a state in which the stacked body 200 is pressed against the wall region 23 by the pressurizing force transmitted from the pressurizing portion 13.

In the state shown in FIG. 8, the height H6 from the installation surface S to the tip end portion 12c of the forming portion 12 matches the height obtained by adding the thickness T1 of the stacked body 200 to the height H1 of the bottom region 21 of the forming jig 20. Therefore, the stacked body 200 is in a state of being in contact with and sandwiched between the pair of bottom regions 21 of the forming jig 20 and the pair of flat portions 10d and 10e of the forming die 10. The pair of flat portions 10d and 10e maintain a state in which the stacked body 200 is pressed against the pair of bottom regions 21 by the pressurizing force transmitted from the movement mechanism 30.

As described above, in the forming method of the present embodiment, the lower surface 200a of the stacked body 200 formed in a flat shape is placed on the forming jig 20, the forming die 10 is pressed on the upper surface 200b of the stacked body 200, and the forming die 10 is moved downward in the height direction HD by the movement mechanism 30. Since the pressurizing force generated by the pressurizing portion 13 is transmitted to the tip end portion 12c of the forming portion of the forming die 10, the stacked body 200 that comes into contact with the tip end portion 12c can be formed along the shape of the wall region 23 of the forming jig 20.

Further, in the forming method of the present embodiment, both end portions of the stacked body 200 in the width direction WD are in a state of being in contact with and sandwiched between both the pair of bottom regions 21 of the forming jig 20 and the pair of flat portions 10d and 10e of the forming die 10. Therefore, both end portions of the stacked body 200 in the width direction WD can be formed along the shape of the bottom region 21 of the forming jig 20.

The forming method of the present embodiment includes a cooling step of cooling the temperature of the resin material contained in the stacked body 200 to a temperature lower than the softening temperature, after the forming of the stacked body 200 is completed and the state shown in FIG. 8 is reached. This cooling step is a step of stopping the heating of the forming jig 20 by the heating mechanism 40 and waiting for a predetermined time after stopping the heating.

In the cooling step, the contact surface 12a is brought into contact with the region of the stacked body 200 formed along the wall region 23 by the tip end portion 12c to maintain the state in which the stacked body 200 is pressed against the wall region 23. Further, in the cooling step, both end portions of the stacked body 200 in the width direction WD maintains a state of being in contact with and sandwiched between both the pair of bottom regions 21 of the forming jig 20 and the pair of flat portions 10d and 10e of the forming die 10.

When the cooling step is completed, the forming die 10 is moved upward in the height direction HD by the movement mechanism 30, and the forming die 10 is removed from the stacked body 200. After that, the stacked body 200 is removed from the forming jig 20 and the next step is executed. For example, when the stacked body 200 contains a thermosetting resin material, the next step is a curing step of accommodating the stacked body 200 in an autoclave and heating the thermosetting resin material to a curing temperature or higher.

The operation and effect of the forming device 100 of the present embodiment described above will be described.

The forming device 100 of the present embodiment includes a forming jig 20, a forming die 10, and a movement mechanism 30 for moving the forming die 10. The forming jig 20 has a wall region 23 that is adjacent to both the bottom region 21 having the first height H1 and the top region 22 having the second height H2 higher than the first height H1, and has a height gradually decreasing from the second height H2 to the first height H1. The forming die 10 has a shape corresponding to the top region 22 and the wall region 23. By moving the forming die 10 to approach the bottom region 21 of the forming jig 20 in the height direction HD by the movement mechanism 30, the stacked body 200 placed on the top region 22 of the forming jig 20 is formed along the shape of the forming jig 20.

Further, according to the forming device 100 of the present embodiment, the pressurizing portion 13 of the forming die 10 generates a pressurizing force by which the tip end portion 12c of the plate-shaped forming portion 12 presses the stacked body 200 against the wall region 23, when the forming die 10 is moved to approach the bottom region 21 by the movement mechanism 30. Therefore, as the forming die 10 approaches the bottom region 21 by the movement mechanism 30, the tip end portion 12c of the plate-shaped forming portion 12 presses the stacked body 200 against the wall region 23 of the forming jig 20 to continuously shape the stacked body 200 without wrinkles.

Further, according to the forming device 100 according to the present disclosure, the forming portion 12 brings the contact surface 12a of the forming portion 12 into contact with the region of the stacked body 200 formed along the wall region 23 by the tip end portion 12c to keep a state where the stacked body 200 is pressed against the wall region 23, when the tip end portion 12c reaches a predetermined position in the height direction HD. This makes it possible to reliably maintain the state in which the stacked body 200 is formed along the surface shape of the forming die 10.

According to the forming device 100 of the present embodiment, by pressing the stacked body 200 against the top region 22 of the forming jig 20 by the pressing portion 14, the stacked body 200 can be formed along the shape of the top region 22 of the forming jig 20. Further, since the forming die 10 is moved while the stacked body 200 is pressed by the pressing portion 14, it is possible to reliably prevent the stacked body 200 placed on the top region 22 of the forming jig 20 from deviating from the top region 22, when forming the stacked body 200.

According to the forming device 100 of the present embodiment, since the resin material contained in the stacked body 200 can be formed while being heated to a softening temperature or higher by the heating mechanism 40, the step of preheating the resin material contained in the stacked body 200 before forming the stacked body 200 can be eliminated.

Other Embodiments

In the above description, the forming jig 20 has the same shape at each position in the axial direction AD, but other aspects may be used. The shape of the forming jig 20 may be continuously changed according to the position in the axial direction AD. For example, the forming jig 20 may have a shape having a constant or indefinite curvature. In this case, the shapes of the contact surface 12a of the forming portion 12 of the forming die 10 and the pressing member 14a of the pressing portion 14 correspond to the surface shape of the forming jig 20 at the position where the forming die 10 is installed.

Further, in the above description, the shape of the stacked body 200 formed by the forming device 100 after the final forming is assumed to be the hat-shaped cross-sectional shape shown in FIG. 8, but other aspects may be used. For example, the shape of the stacked body 200 formed by the forming device 100 after the final forming may be the C-shaped cross-sectional shape shown in FIG. 9.

Figure 9:
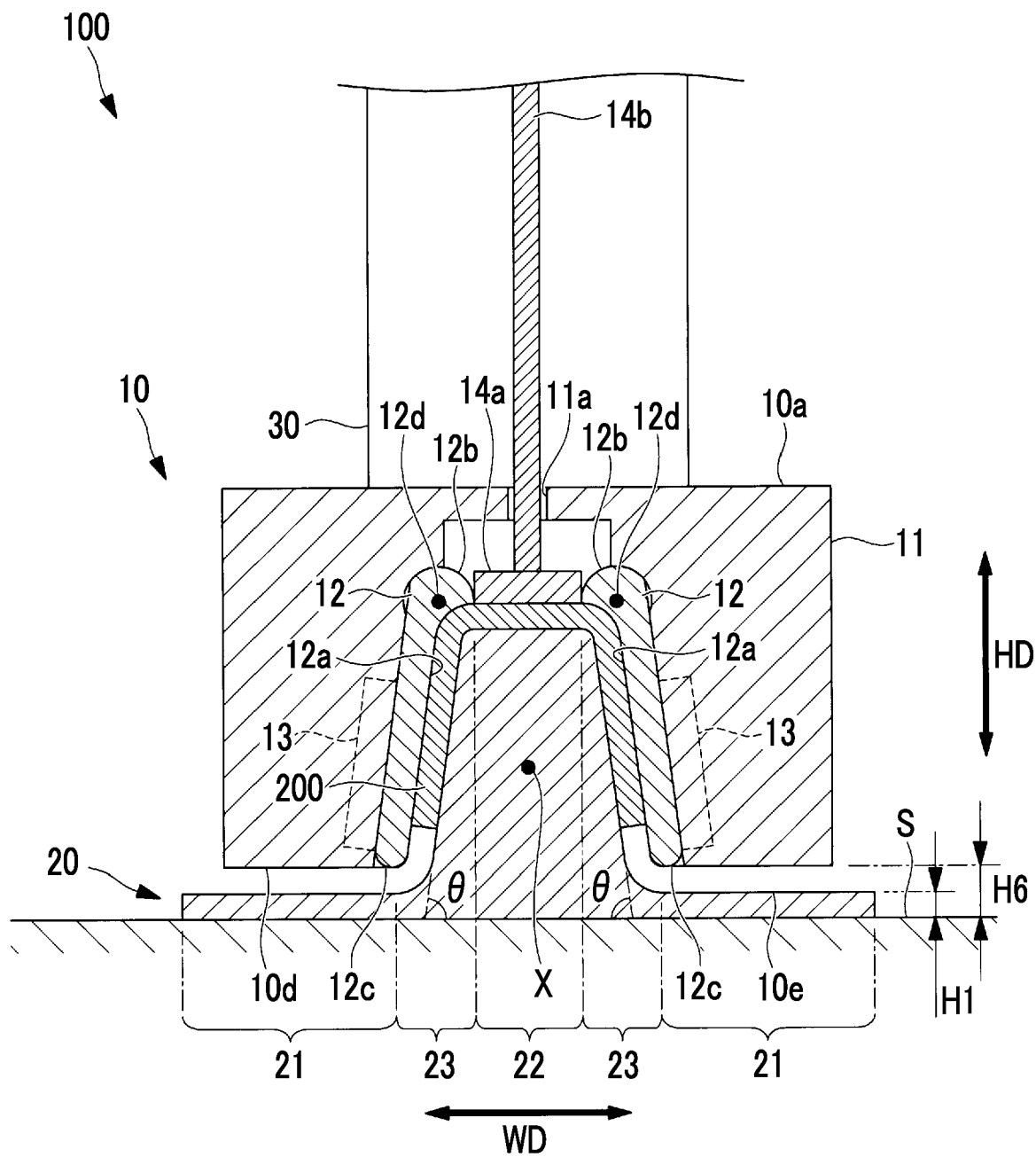
FIG. 9 is a cross-sectional view of the forming device showing a state after the forming of the stacked body is completed.

FIG. 9 is a cross-sectional view of the forming device 100 showing a state after the forming of the stacked body 200 is completed. It is assumed that the forming device 100 shown in FIG. 8 and the forming device 100 shown in FIG. 9 are the same device. The difference between FIGS. 8 and 9 is the length in the width direction WD of the stacked body 200 before being formed by the forming device 100.

The length in the width direction WD of the stacked body 200 before forming the stacked body 200 shown in FIG. 9 by the forming device 100 is shorter than the length in the width direction WD of the stacked body 200 before forming the stacked body 200 shown in FIG. 8 by the forming device 100. In a state where the forming is completed by the forming device 100, the stacked body 200 shown in FIG. 9 is in a state where the end portions in the width direction WD are sandwiched between the forming portion 12 of the forming die 10 and the wall regions 23 of the forming jig 20.

Further, in the above description, the forming device 100 is provided with the heating mechanism 40, but may not be provided with the heating mechanism 40. In this case, it is assumed that the stacked body 200 formed by the forming device 100 is preliminarily set such that the resin material contained in the stacked body 200 becomes equal to or higher than the softening temperature, before being installed on the forming jig 20.

The forming device described in the embodiment described above is understood as follows, for example.

A forming device (100) according to the present disclosure forms a stacked body (200) formed by stacking a plurality of sheet-shaped composite materials including a fiber base material and a resin material, the forming device including: a forming jig (20) that extends in an axial direction (AD), and has, in a width direction (WD) that is orthogonal to the axial direction, a bottom region (21) having a first height (H1), a top region (22) having a second height (H2) higher than the first height, and a wall region (23) that is adjacent to both the bottom region and the top region and has a height gradually decreasing from the second height to the first height; a forming die (10) having a shape corresponding to the top region and the wall region of the forming jig; and a movement mechanism that moves the forming die or the forming jig such that the forming die approaches the bottom region in a height direction (HD) that is orthogonal to both the axial direction and the width direction, and forms the stacked body placed on the top region of the forming jig along a shape of the forming jig, in which the forming die includes a main body portion (11), a plate-shaped forming portion (12) having a base end portion (12b) attached to the main body portion to be swingable around a swing shaft (12d) extending in the axial direction, and a contact surface (12a) formed in a shape corresponding to the wall region, and a pressurizing portion (13) that generates a pressurizing force by which a tip end portion (12c) of the forming portion presses the stacked body against the wall region, when the forming die is moved to approach the bottom region by the movement mechanism, and when the tip end portion reaches a predetermined position in the height direction, the forming portion brings the contact surface of the forming portion into contact with a region of the stacked body formed along the wall region by the tip end portion to maintain a state where the stacked body is pressed against the wall region.

According to the forming device according to the present disclosure, a forming jig, a forming die, and a movement mechanism for moving the forming die or the forming jig are provided. The forming jig has a wall region that is adjacent to both the bottom region having the first height and the top region having the second height higher than the first height, and has a height gradually decreasing from the second height to the first height. The forming die has a shape corresponding to the top region and the wall regions. By moving the forming die or the forming jig such that the forming die approaches the bottom region of the forming jig in the height direction by the movement mechanism, the stacked body placed on the top region of the forming jig is formed according to the shape of the forming jig.

Further, according to the forming device of the present disclosure, the pressurizing portion of the forming die generates a pressurizing force by which the tip end portion of the plate-shaped forming portion presses the stacked body against the wall region, when the forming die or the forming jig is moved to approach the bottom region by the movement mechanism. Therefore, as the forming die approaches the bottom region by the movement mechanism, the tip end portion of the plate-shaped forming portion presses the stacked body against the wall region of the forming jig to continuously form the stacked body without wrinkles.

Further, according to the forming device according to the present disclosure, the forming portion brings the contact surface of the forming portion into contact with the region of the stacked body formed along the wall region by the tip end portion to keep a state where the stacked body is pressed against the wall region, when the tip end portion reaches a predetermined position in the height direction. This makes it possible to reliably maintain the state in which the stacked body is formed along the shape of the forming jig.

The forming device according to the present disclosure may be configured such that the forming jig has a pair of the wall regions adjacent to the top region and a pair of the bottom regions adjacent to the pair of wall regions in the width direction, the forming die has a shape corresponding to the top region and the pair of wall regions, and the forming die has a pair of the forming portions and a pair of the pressurizing portions.

In the forming device according to the present configuration, the forming jig has a pair of wall regions adjacent to the top region, and a pair of bottom regions adjacent to the pair of wall regions. In addition, the forming die has a shape corresponding to the top region and the pair of wall regions. Therefore, according to the forming device according to the present configuration, the stacked body can be formed into a hat-shaped shape or a C-shaped shape having a top region and a pair of wall regions adjacent to the top region.

The forming device according to the present disclosure includes a pressing portion (14) that presses the stacked body against the top region, in which the movement mechanism may move the forming die to approach the bottom region in the height direction, in a state where the stacked body is pressed by the pressing portion.

According to the forming device of the present configuration, by pressing the stacked body against the top region of the forming jig by the pressing portion, the stacked body can be formed along the shape of the top region of the forming jig. Further, since the forming die is moved while the stacked body is pressed by the pressing portion, it is possible to reliably prevent the stacked body placed on the top region of the forming jig from deviating from the top region, when forming the stacked body.

In the forming device according to the present disclosure, a plurality of the forming dies disposed in the axial direction may be further provided, and the movement mechanism may be configured to move the plurality of forming dies to approach the bottom region in the height direction.

According to the forming device of the present configuration, since the plurality of forming dies are disposed in the axial direction, each region of the stacked body can be formed according to the length in the axial direction of the plurality of forming dies. In addition, when using a forming jig of which shape changes in the axial direction, the shape of the forming die in each region in the axial direction corresponds to the shape of the forming jig in each region, so that the stacked body can be appropriately formed along the shape of the forming jig in the axial direction.

The forming device according to the present disclosure may be configured to include a heating mechanism that heats the resin material contained in the stacked body to a temperature equal to or higher than a softening temperature.

According to the forming device of the present configuration, since the resin material contained in the stacked body can be formed while being heated to a softening temperature or higher by the heating mechanism, the step of preheating the resin material contained in the stacked body before forming the stacked body can be eliminated.

In the forming device according to the present disclosure, the main body portion is attached to the movement mechanism, and the movement mechanism may be configured to move the main body portion such that the forming die approaches the bottom region in the height direction.

According to the forming device of the present configuration, the forming die can be brought closer to the bottom region of the forming jig, by moving the main body portion of the forming die by the movement mechanism.

The forming method described in the embodiment described above is understood as follows, for example.

A forming method according to the present disclosure is a forming method for pressing a forming die against a stacked body formed into a flat shape by stacking a plurality of sheet-shaped composite materials including a fiber base material and a resin material to form the stacked body into a shape of a forming jig, in which the forming jig extends in an axial direction, and has, in a width direction that is orthogonal to the axial direction, a bottom region having a first height, a top region having a second height higher than the first height, and a wall region that is adjacent to both the bottom region and the top region and has a height gradually decreasing from the second height to the first height, the forming die has a shape corresponding to the top region and the wall region of the forming jig, and includes a main body portion, a plate-shaped forming portion having a base end portion attached to the main body portion to be swingable around a swing shaft extending in the axial direction, and a contact surface formed in a shape corresponding to the wall region, and a pressurizing portion that generates a pressurizing force by which a tip end portion of the forming portion presses the stacked body against the wall region, when the forming die is moved to approach the bottom region, the forming method including: a forming step of moving the forming die or the forming jig such that the forming die approaches the bottom region in a height direction that is orthogonal to both the axial direction and the width direction, and forms the stacked body placed on the top region of the forming jig along a shape of the forming jig, in which in the forming step, when the tip end portion reaches a predetermined position in the height direction, the contact surface is brought into contact with a region of the stacked body formed along the wall region by the tip end portion to maintain a state where the stacked body is pressed against the wall region.

According to the forming method according to the present disclosure, the stacked body is formed into the shape of the forming jig, by pressing the forming die against the stacked body. The forming jig has a wall region that is adjacent to both the bottom region having the first height and the top region having the second height higher than the first height, and has a height gradually decreasing from the second height to the first height. The forming die has a shape corresponding to the top region and the wall regions. By moving the forming die to approach the bottom region of the forming jig in the height direction in the forming step, the stacked body placed on the top region of the forming jig is formed along the shape of the forming jig.

Further, according to the forming method according to the present disclosure, the pressurizing portion of the forming die generates a pressurizing force by which the tip end portion of the plate-shaped forming portion presses the stacked body against the wall region, when the forming die is moved to approach the bottom region in the forming step. Therefore, as the forming die approaches the bottom region in the forming step, the tip end portion of the plate-shaped forming portion presses the stacked body against the wall region of the forming jig to continuously form the stacked body without wrinkles.

Further, according to the forming method according to the present disclosure, when the tip end portion reaches a predetermined position in the height direction, the forming portion brings the contact surface of the forming portion into contact with a region of the stacked body formed along the wall region by the tip end portion to maintain a state where the stacked body is pressed against the wall region. This makes it possible to reliably maintain the state in which the stacked body is formed along the shape of the forming jig.

The forming method according to the present disclosure includes a pressing step of pressing the stacked body against the top region, in which in the forming step, the forming die may be moved to approach the bottom region in the height direction, in a state where the stacked body is pressed in the pressing step.

According to the forming method of the present configuration, by pressing the stacked body against the top region of the forming jig in the pressing step, the stacked body can be formed along the shape of the top region of the forming jig. Further, in the forming step, the forming die is moved while the stacked body is pressed, it is possible to reliably prevent the stacked body placed on the top region of the forming jig from deviating from the top region, when forming the stacked body.

In the forming method according to the present disclosure, the forming step may be configured to move a plurality of the forming dies (10) disposed in the axial direction (AD) to approach the bottom region (21) in the height direction (HD).

According to the forming method of the present configuration, since the plurality of forming dies are disposed in the axial direction, each region of the stacked body can be formed according to the length in the axial direction of the plurality of forming dies. In addition, when using a forming jig of which shape changes in the axial direction, the shape of the forming die in each region in the axial direction corresponds to the shape of the forming jig in each region, so that the stacked body can be appropriately formed along the shape of the forming jig in the axial direction.

The forming method according to the present disclosure may be configured to include a heating step of heating the resin material contained in the stacked body to a temperature equal to or higher than a softening temperature.

According to the forming method of the present configuration, since the resin material contained in the stacked body can be formed while being heated to a softening temperature or higher in the heating step, the step of preheating the resin material contained in the stacked body before forming the stacked body can be eliminated.

The forming method according to the present disclosure may further include a cooling step of cooling a temperature of the resin material contained in the stacked body to a temperature lower than the softening temperature, in a state where the contact surface is brought into contact with a region of the stacked body formed along the wall region by the tip end portion and the stacked body is pressed against the wall region in the forming step.

According to the forming method of the present configuration, the temperature of the resin material contained in the stacked body is cooled to a temperature lower than the softening temperature, in a state where the contact surface of the forming portion is brought into contact with the stacked body and is pressed against the wall region. By removing the forming die after passing through the cooling step, it is possible to reliably maintain the state where the stacked body is formed along the shape of the forming jig.

In the forming method according to the present disclosure, the forming step may be configured to move the main body portion such that the forming die approaches the bottom region in the height direction.

According to the forming method of the present configuration, the forming die can be brought closer to the bottom region of the forming jig, by moving the main body portion of the forming die in the forming step.

REFERENCE SIGNS LIST

10 Forming die
10a Upper surface
10b Lower surface
10c Recessed portion
10d, 10e Flat portion
11 Main body portion
12 Forming portion
12a Contact surface
12b Base end portion
12c Tip end portion
13 Pressurizing portion
14 Pressing portion
14a Pressing member
14b Moving member
20 Forming jig
21 Bottom region
22 Top region
23 Wall region
30 Movement mechanism
40 Heating mechanism
100 Forming device
200 Stacked body
200a Lower surface
200b Upper surface
AD Axial direction
HD Height direction
S Installation surface
WD Width direction
X Axis line
θ Inclination angle

The invention claimed is:

1. A forming method for pressing a forming die against a stacked body in which a plurality of sheet-shaped composite materials including a fiber base material and a resin material are stacked to form the stacked body into a shape of a forming jig, in which
    the forming jig extends in an axial direction, and has, in a width direction that is orthogonal to the axial direction, a bottom region having a first height, a top region having a second height higher than the first height, and a wall region that is adjacent to both the bottom region and the top region and has a height gradually decreasing from the second height to the first height,
    the forming die has a shape corresponding to the top region and the wall region of the forming jig, and includes
        a main body portion,
        a plate-shaped forming portion having a base end portion attached to the main body portion to be swingable around a swing shaft extending in the axial direction, and a contact surface formed in a shape corresponding to the wall region, and
        a pressurizing portion that generates a pressurizing force by which a tip end portion of the forming portion presses the stacked body against the wall region, when the forming die is moved to approach the bottom region,
    the forming method comprising:
    a forming step of moving the forming die or the forming jig such that the forming die approaches the bottom region in a height direction that is orthogonal to both the axial direction and the width direction, and forms the stacked body placed on the top region of the forming jig along a shape of the forming jig, wherein
        in the forming step, when the tip end portion reaches a predetermined position in the height direction, the contact surface is brought into contact with a region of the stacked body formed along the wall region by the tip end portion to maintain a state where the stacked body is pressed against the wall region.

2. The forming method according to claim 1, further comprising:

a pressing step of pressing the stacked body against the top region, wherein in the forming step, the forming die is moved to approach the bottom region in the height direction, in a state where the stacked body is pressed in the pressing step.

3. The forming method according to claim 1, wherein in the forming step, a plurality of the forming dies disposed in the axial direction are moved to approach the bottom region in the height direction.

4. The forming method according to claim 1, further comprising:

a heating step of heating the resin material contained in the stacked body to a temperature equal to or higher than a softening temperature.

5. The forming method according to claim 4, further comprising:

a cooling step of cooling a temperature of the resin material contained in the stacked body to a temperature lower than the softening temperature, in a state where the contact surface is brought into contact with a region of the stacked body formed along the wall region by the tip end portion and the stacked body is pressed against the wall region in the forming step.

6. The forming method according to claim 1, wherein in the forming step, the main body portion is moved such that the forming die approaches the bottom region in the height direction.

\* \* \* \* \*